United States Patent [19]
Stevens

[11] 3,769,797
[45] Nov. 6, 1973

[54] BY-PASS ENGINE HAVING A SINGLE, THRUST DIVERTER VALVE MECHANISM FOR A V/STOL AIRCRAFT

[75] Inventor: Emerson W. Stevens, Buffalo, N.Y.

[73] Assignee: The United States of America as represented by the Secretary of the Air Force, Washington, D.C.

[22] Filed: Oct. 28, 1971

[21] Appl. No.: 193,436

[52] U.S. Cl.............. 60/226 R, 60/229, 239/265.29
[51] Int. Cl. ........................... F02k 1/20, F02k 3/04
[58] Field of Search ......................... 60/226 R, 229; 239/265.29

[56] References Cited
UNITED STATES PATENTS

| 3,167,911 | 2/1965 | Sandre | 60/229 |
| 3,280,560 | 10/1966 | Marchant | 60/226 R |
| 3,568,931 | 3/1971 | Mortlock | 239/265.29 |
| 3,577,736 | 5/1971 | Stevens | 60/226 R |
| 3,611,725 | 10/1971 | Short | 239/265.29 |

FOREIGN PATENTS OR APPLICATIONS

| 1,269,656 | 7/1961 | France | 60/226 R |

*Primary Examiner*—Douglas Hart
*Attorney*—Harry A. Herbert, Jr. et al.

[57] ABSTRACT

A thrust diverter valve assembly for a bypass engine including a plurality of flap elements pivotally mounted for alternate adjustments between a first position diverting bypass flow to a straight-through passage for augmenting the main thrust being developed, and a second position diverting the bypass flow to a vertical-takeoff-and-landing mode of operation. Hinged sections provide sealing between adjacent flap elements, and serve as flow-straightening vanes when the flap elements have been adjusted to their vertical flight mode.

1 Claim, 3 Drawing Figures

Patented Nov. 6, 1973 3,769,797

INVENTOR.
EMERSON W. STEVENS
BY Harry A. Herbert Jr.
ATTORNEY
Arthur R. Parker
AGENT

BY-PASS ENGINE HAVING A SINGLE, THRUST DIVERTER VALVE MECHANISM FOR A V/STOL AIRCRAFT

BACKGROUND OF THE INVENTION

This invention relates to the use of the bypass engine principally for VTOL aircraft.

In the continued development of jet aircraft that have previously required ever-increasing take-off and landing speeds and therefore runway distances, there has been a considerable effort in progress to design aircraft with lower and lower minimum takeoff and landing speeds in order to substantially decrease the take-off and landing area required. To this end, both the VTOL, vertical-takeoff-and-landing aircraft and STOL, short-takeoff-and-landing aircraft, and the necessary power plants therefor, have been under development for many years. Many of the VTOL aircraft are equipped with "high-lift" devices and are therefore also designed to perform short takeoffs and landings. These aircraft are usually referred to as V/STOL aircraft. Concurrent with the development of such VTOL and/or V/STOL aircraft has been the development of improved types of various propulsion systems, such as the rotor, propeller, ducted fan, and turbojet engines. The present invention is concerned with an improved means for diverting the thrust of a by-pass engine, which, of course, is a modified turbojet engine, from the horizontal or forward flight mode of operation to the vertical flight mode of operation. The by-pass engine is selected for application of the present improvement, to be further explained, because the pure turbojet, as is well-known, suffers from the disadvantage of relatively low propulsive efficiency at low speeds, due to its jet exhaust velocity being far greater than that of the aircraft itself. Thus, with the VTOL or V/STOL aircraft, vertical or almost vertical takeoffs, for example, are possible until a safe height has been reached that is sufficient to clear any obstacles, whereupon transition to horizontal or forward thrust occurs. To provide the required greater propulsive efficiency at low speed in a more effective manner than other systems heretofor proposed, the present applicant developed the thrust diverter means described and claimed in a copending patent application, Ser. No. 77,776, filed Oct. 5, 1970, and now U.S. Pat. No. 3,660,981, issued on May 9, 1972 on an invention entitled "The V/STOL Aircraft." In the latter application, a source of compressed air is utilized to act against, and thereby control the movement of a secondary air flow around the main turbojet engine portion either to the horizontal, thrust-augmentation configuration, or to the vertical flight mode. The single, thrust diverter valve mechanism of the present invention constitutes a further novel development of the use of the by-pass engine in VTOL aircraft, as will appear self-evident hereinafter in the following summary and detailed description thereof.

SUMMARY OF THE INVENTION

The present invention consists in a by-pass engine incorporating a single, thrust diverter valve assembly having a plurality of flap elements hingedly mounted with the bypass portion of the engine for pivotal movement in one of two positions respectively blocking bypass flow from a bypass annulus formed in the engine into one or the other of two bypass passages or chambers respectively representing the horizontal and vertical flight modes of operation. Hinged sections are incorporated between adjacent flap elements to maintain a seal therebetween, and to serve as flow-straightening vanes during the vertical flight mode of operation.

Certain objects and advantages of the invention will become readily apparent from the following disclosure thereof, taken in connection with the accompanying drawings, in which:

DESCRIPTION OF THE PREFERRED EMBODIMENT

Figure 1:
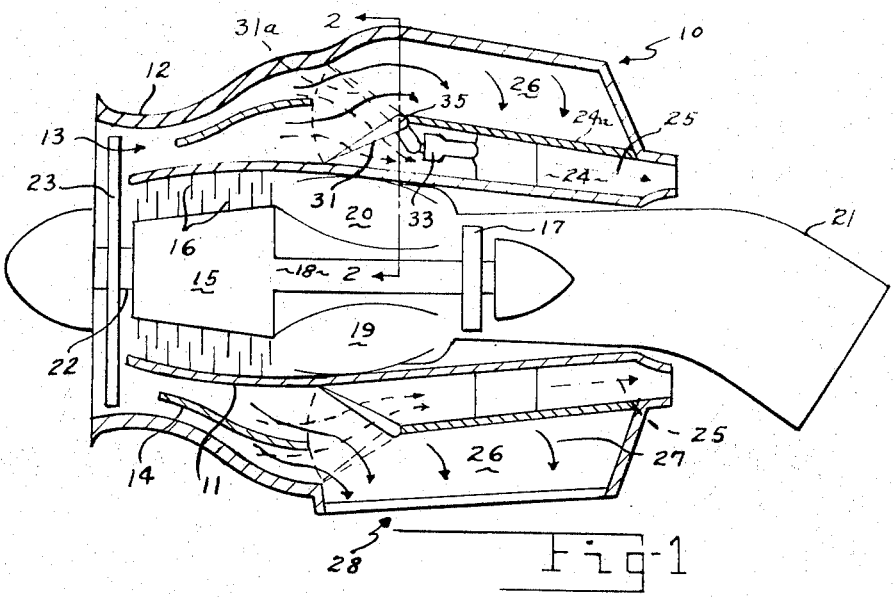
FIG. 1 is a longitudinal sectional and schematic view, illustrating the overall configuration of one form of bypass fanturbojet engine to which the improvement of the present invention may be applied.

Referring particularly to FIG. 1 of the drawings, a bypass fan-type of turbojet engine to which the improvement of the present invention may be applied is indicated generally at 10 as including, in part, an inner shell 11, an outer shell 12 forming a bypass annulus therebetween, as is indicated at 13, in which bypass annulus 13 may be positioned the diffuser 14. Housed or enclosed within the inner shell 11 is the pure turbojet engine-portion of the present engine which consists principally of a compressor section comprising the main, compressor-support member at 15 and a plurality of alternately arranged stator and rotor blade elements, indicated generally at 16, a turbine at 17, a main, rotatable supporting shaft, indicated at 18 as being disposed in interconnected relation between said compressor-support member 15 and said turbine 17, a pair of combustion chambers at 19 and 20, and an exhaust or tail pipe section at 21.

Mounted for simultaneous rotation with, and immediately forward or upstream of the compressor-support member 15, on the stub shaft element 22, is the fan, indicated in schematic form at 23. As clearly depicted in the aforementioned FIG. 1, the peripheral portions of the fan 23 extend in an overlapping relation to the inlet of the bypass annulus 13, so that rotation of the fan 23 results in the formation of both a primary compressed air flow through the compressor section 15, 16 and the turbine 17, and a bypass or secondary air flow through the bypass annulus 13 for entry into one or the other of two annular passages or chambers to be hereinafter further described. The primary air flow through the inlet of the compressor section 15, 16, of course, is directed downstream to the combustion chambers 19 and 20 where it is mixed with fuel and ignited in a well-known manner, and thereafter the hot combustible products thereof are exhausted against, and cause rotation of, the blades of the turbine 17. This rotation of the turbine 17 naturally effects a rotation of the compressor section 15, 16 in the usual manner of operation of the pure turbojet engine. In this regard, it is noted that, although in the schematic view of FIG. 1, only one compressor section has been illustrated, in practice, there may be both low and high pressure-compressor sections incorporated therewithin. Also, in the present arrangement, the single turbine at 17 is depicted as providing the operating means for both the compressor section 15, 16 and the fan 23. However, a second turbine (not shown) would generally be used for this purpose without departing from the true spirit or scope of the invention. In any event, the hot combustible products formed by the primary air flow would be exhausted out the tail pipe section 21, after the extraction of a portion of its energy to drive the compressor section 15, 16 and, in this case, the fan 23, to thereby provide the principal thrust for forward flight.

The bypass or secondary, cold and compressed air flow being urged through the bypass annulus 13 by the fan 23 may be alternately directed into one or the other of two bypass or secondary flow paths by the novel and yet greatly simplified single, thrust diverter valve assembly of the present invention to thereby either augment the main thrust being produced by the exhaustion of combustible products out the tail pipe section 21 for forward flight, or to change the secondary air flow to the vertical flight mode of operation. For this purpose, for the forward or horizontal flight mode, the bypass annulus 13 communicates with a first, bypass or secondary air flow path formed by a first, substantial axially-aligned, annular passage or relatively elongated chamber at 24 that is also open at its rear end and in which the direction of flow is indicated by the broken arrows at 25. For the vertical flight mode, said bypass annulus 13 also communicates with a second, bypass or secondary air flow path formed by a second, annular passage or relatively enlarged chamber, indicated at 26, that is disposed further outwardly of, and in concentric relation to, the said first, annular passage or elongated chamber 24 and incorporates an opening, or what may be called the vertical-take-off and landing (VTOL) outlet, indicated generally at 28, that is naturally oriented in a vertically-downward direction to thereby direct the entire bypass or secondary air flow in the said passage or enlarged chamber 26 in the direction of the solid arrows at 27 for the vertical take off-and-landing flight condition.

Figure 2:
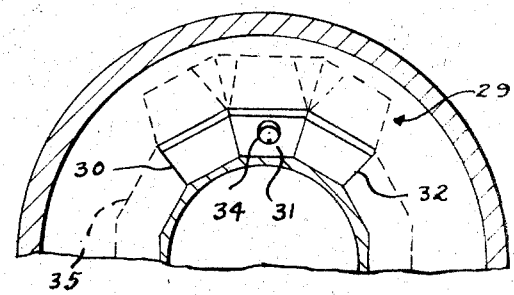
FIG. 2 is a broken-away, partly schematic, and cross-sectional view, taken about on line 2—2 of FIG. 1, showing certain details of the improved valve assembly of the invention.

To alternately direct the bypass or secondary air flow entering the bypass annulus 13 into either of the previously-referred to forward or vertical flight modes of operation, the improved single, thrust diverter valve assembly of the present invention may be installed in the bypass fan-turbojet engine 10 between the inner end and outer shells 11 and 12 thereof, and operate in the novel and yet simplified manner to be hereinafter described. Said diverter valve assembly, which is indicated generally at 29 in FIG. 2, may consist of a plurality of separate flap segments, preferably consisting of a total of twelve and arranged in interconnected sets of three each, such as is indicated, for example, at 30, 31 and 32 in the aforementioned FIG. 2. The said flap segments may be hingedly mounted for pivotal movement relative to a main support means, seen at 24a in FIG. 1, which support means 24a may comprise one of the wall surfaces of the passage or chamber 24. With this arrangement, a single actuator, as at 33 in FIG. 1, may be used to operate or pivot each set of three flap segments, as at 30, 31 and 32, to either of the two operative positions, depicted in solid and dashed lines in both FIGS. 1 and 2. In the aforesaid FIG. 1, the middle flap segment of the above-described set of three is indicated at the reference numeral 31. Said actuator 33 is shown applied to the said flap segment 31 at the point of application indicated at 34 in FIG. 2. The centerline or hinge axis of the entire group of flap segments is depicted schematically at 35.

Figure 3:
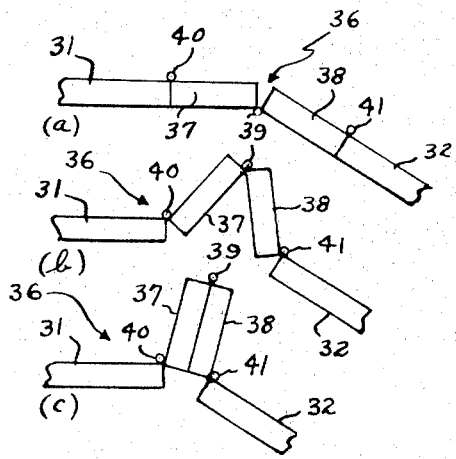
FIGS. 3a, b and c represent relatively enlarged schematic and broken-away fragmentary views, illustrating respectively the forward, transition and vertical flight configurations of the improved and yet simplified hinged sections formed between adjacent flap segments comprising the novel valve assembly of the invention.

Again referring to FIG. 2, it is clearly seen that the flap segments, as at 30, 31 and 32, of the present single, thrust diverter valve assembly 29 have each been constructed with a tapered configuration, formed by a greater width at the hinge axis 35, for the specific purpose of accommodating the reduced area available to the said flap segments when they have been pivoted to their solid line position, seen in FIG. 2, for example. In this connection, the unique thrust diverter valve assembly 29 comprising the improvement of the present invention further incorporates novel hinged sections at, and interconnected with, the edges of adjacent flap segments, as at 30, 31 and 32, the important parts of which hinged sections being illustrated in the fragmentary views of FIGS. 3a, b and c. In FIG. 3a, for example, the hinged section thereof is indicated generally at 36 as consisting of a pair of hinge-plate elements at 37 and 38 that are respectively hinged to each other at 39 and are further hinged to the flap segments, for example, those indicated at 31 and 32 in FIG. 2, by means of the hinge means indicated generally, schematically and respectively at the reference numreals 40 and 41. With the aforesaid hinged sections, as at 36, a sealed relation between the various flap segments, as at 30, 31 and 32, is maintained in all positions of the said flap segments. Moreover, said hinged sections, as at 36, serve as flow-straightening vanes in the vertical takeoff-and-landing mode of operation to be hereinafter further described. In this connection, FIGS. 3a, b and c respectively illustrate the positions of the said hinged sections 36 during the forward flight mode, the transition period, and the vertical-takeoff-and-landing (VTOL) mode of operation of the present invention.

With the foregoing system, the flap segments 29 comprising the inventive single, thrust diverter valve assembly 29 may be easily adjusted to either of the previously-mentioned two operative positions either to augment the main thrust being developed for forward flight, or alternatively, to achieve the desired vertical flight mode. For the aforesaid thrust-augmentation mode of flight operation or, in other words, for the forward flight condition, the plurality of flap segments, as for example, the previously-noted flap segments 30, 31 and 32, would be adjusted, as by means of their pivoting about the pivot or hinge axis 35 of the previously-noted support means 24a, through the actuation of the actuator, such as is indicated at 33 in FIG. 1, to the dotted line position, indicated at 31a for the flap segment 31 in FIG. 1. This action results in the closing of communication between, and therefore the flow of bypass or secondary air from the bypass annulus 13 into the previously-described second, annular passage or relatively enlarged chamber 26 of the vertical flight mode of operation. Simultaneously therewith, the pivoting of the diverter valve assembly-flap segments, such as at 31, to the dotted line position of 31a, results in the concurrent opening of communication between, and the formation of, a straight-through flow path comprising the said bypass annulus 13 and the first, substantially axially aligned, relatively elongated passage or chamber 24 (Note FIG. 1) for thereby diverting and exhausting the entire bypass or secondary air flow directly out the open rear or bypass nozzle end of said annular passage 24 to thus augment the main forward thrust of the engine.

When the vertical flight mode (VTOL) is desired, the flap segments comprising the present valve assembly, as at 30, 31 and 32, may be pivoted to the solid line position, as for example that depicted for the flap segment 31, whereupon the flow of bypass or secondary air to the first, relatively elongated passage or chamber 24 (Note FIG. 1) is blocked, and the said flow is thereby simultaneously diverted to the now-opened communication between the said by-pass annulus 13 and the second, relatively enlarged, outer chamber at 26 which is, in turn, in open communication with the VTOL system outlet opening at 28, for thereby directing the bypass or secondary air flow in a vertically downward direction and thus achieve vertical or substantially vertical flight in either takeoff or landing configuration.

I claim:

1. A bypass fan engine incorporating a main, forward thrust-producing, turbojet portion including compressor, turbine, combustion and main exhaust sections for acting on, and producing the main, forward thrust of the engine from the hot combustible products of the mixture of fuel and a primary air flow therethrough; and a combined, forward thrust-augmentation and vertical-takeoff-and-landing producing portion including a bypass annulus arranged in concentric and surrounding relation to, and outwardly of and between the casing of the said turbojet engine-portion constituting an inner shell element, and an outer shell element spaced from said inner shell element; said by-pass annulus further having an upstream or inlet end portion open to the main air inlet of the engine, a fan for directing, pressurizing and converting a portion of the main engine-incoming air into a by-pass or secondary air flow initially entering the said upstream or inlet end portion of said by-pass annulus, and a combined wall and valve mechanism-support member intermediately-disposed between the said inner and outer shell elements comprising said by-pass annulus, and oriented in surrounding relation to the said turbojet engine-portion, said wall and support member being further arranged to divide said bypass annulus into both substantially horizontally and vertically-oriented flow paths respectively comprised of a first, relatively narrow and horizontal, bypass or secondary air flow-passage means disposed in immediate concentric relation to the casing/inner shell element of said turbojet engine-portion and having a first, relatively small inlet portion in open communication with, and receiving the bypass or secondary air flow from, the upstream or inlet end portion of said bypass annulus, and a first, horizontally-oriented exhaust means forming a first, substantially straight-through and relatively narrow flow path-passage with the said upstream or inlet end portion of said by-pass annulus for thereby exhausting the bypass or secondary air flow entering the said bypass annulus and said substantially straight-through flow path-passage in a rearward direction to thus substantially augment the main, forward thrust being produced by the turbojet engine-portion; and a second, separate, relatively enlarged and substantially vertically-oriented, bypass or secondary air flow path-passage means disposed further outwardly of, and between the said combined wall and valve mechanism-support member forming the said first-named passage means and the said by-pass annulus-outer shell element, said relatively enlarged and substantially vertically-oriented, flow path-passage means further having a second, relatively enlarged, inlet portion in open communication with, and receiving the bypass or secondary air flow from, the upstream or inlet end portion of said by-pass annulus at an angle relative to, and further outwardly of, the said first, inlet portion of said first-named passage means, and a second, downwardly-oriented, exhaust means forming a second, substantially vertical, flow path-passage with the said upstream or inlet end portion of said bypass annulus for thereby exhausting the bypass or secondary air flow entering said bypass annulus and said second, vertically-oriented flow path-passage in a vertically-downward direction representing the vertical-takeoff-and-landing mode of engine operation; and thrust diverter valve means for alternately directing the bypass or secondary air flow entering said bypass annulus into one or the other of said first and second-named, bypass or secondary air flow-passages to thereby either augment the main, forward thrust being produced in the engine, or to establish the vertical-takeoff-and-landing configuration thereof; said thrust diverter valve means comprising; a plurality of separate flap segments interconnected in sealed relation to each other, in a predetermined number of sets, by a series of flap sections pivotally mounted in alternate relation between successive flap segments, and being further collectively hinged, for pivotal movement, in circumferential relation to, and around the upstream end of the said combined wall and valve mechanism-support member; said thrust diverter valve means further comprising power means respectively interconnected with each of the said predetermined number of flap segment-sets for thereby pivoting said plurality of flap segments to either of two alternate positions respectively blocking either the first-named, forward thrust-augmenting, straight-through flow path-passage, or the second-named, substantially vertically-oriented, flow path-passage; said flap segments further having a tapered configuration with the greater width at the hinge axis for thereby positively accommodating for the reduced area available when the said flap segments have pivoted to the said first-named passage in blocking position immediately upstream of the first, relatively small inlet portion of the said relatively narrow and horizontal, by-pass or secondary air flow-passage means comprising the forward thrust-augmentation mode of engine operation.

* * * * *